H. H. HARRIS.
EXCAVATING MECHANISM.
APPLICATION FILED JAN. 31, 1911.

1,000,263.

Patented Aug. 8, 1911.
2 SHEETS—SHEET 1.

Witnesses
Brennan B. West.
Oliver M. Kappler

Inventor
Hollis H. Harris,
By Albert H. Baker,
Atty.

H. H. HARRIS.
EXCAVATING MECHANISM.
APPLICATION FILED JAN. 31, 1911.

1,000,263.

Patented Aug. 8, 1911.
2 SHEETS—SHEET 2.

Witnesses
Brennan B. West.
Oliver M. Kappler.

Inventor
Hollis H. Harris,
By Albert H. Bates,
Atty.

UNITED STATES PATENT OFFICE.

HOLLIS H. HARRIS, OF LORAIN, OHIO, ASSIGNOR TO THE THEW MANUFACTURING COMPANY, OF LORAIN, OHIO, A CORPORATION OF OHIO.

EXCAVATING MECHANISM.

1,000,263.      Specification of Letters Patent.      Patented Aug. 8, 1911.

Application filed January 31, 1911. Serial No. 605,813.

*To all whom it may concern:*

Be it known that I, HOLLIS H. HARRIS, a citizen of the United States, residing at Lorain, in the county of Lorain and State of Ohio, have invented a certain new and useful Improvement in Excavating Mechanism, of which the following is a full, clear, and exact description, reference being had to the accompanying drawings.

The object of this invention is to provide an efficient excavating apparatus adapted for use in digging and removing material from confined places. For example, my excavator is of great utility in tunnel work, sewer digging, mine work, etc.

My invention provides a bucket and suitable operating mechanism therefor carried by a structure which is mounted on a truck arranged to straddle a cart which may receive its load from the bucket in front of the truck and pass rearwardly beneath it and between its wheels. The bucket has a strut arm, the upper end of which is adapted to be moved in or out along a trackway, the outward moving enabling the digging to be accomplished along a substantially horizontal plane and an inward movement being adapted to bring the bucket into position over the cart directly in front of the truck. By this means I am enabled to effectively dig within a confined space and remove the dug material very effectively.

The invention comprises the means I employ in carrying out this idea, as hereinafter more fully explained and set out in the claims.

Figure 1:
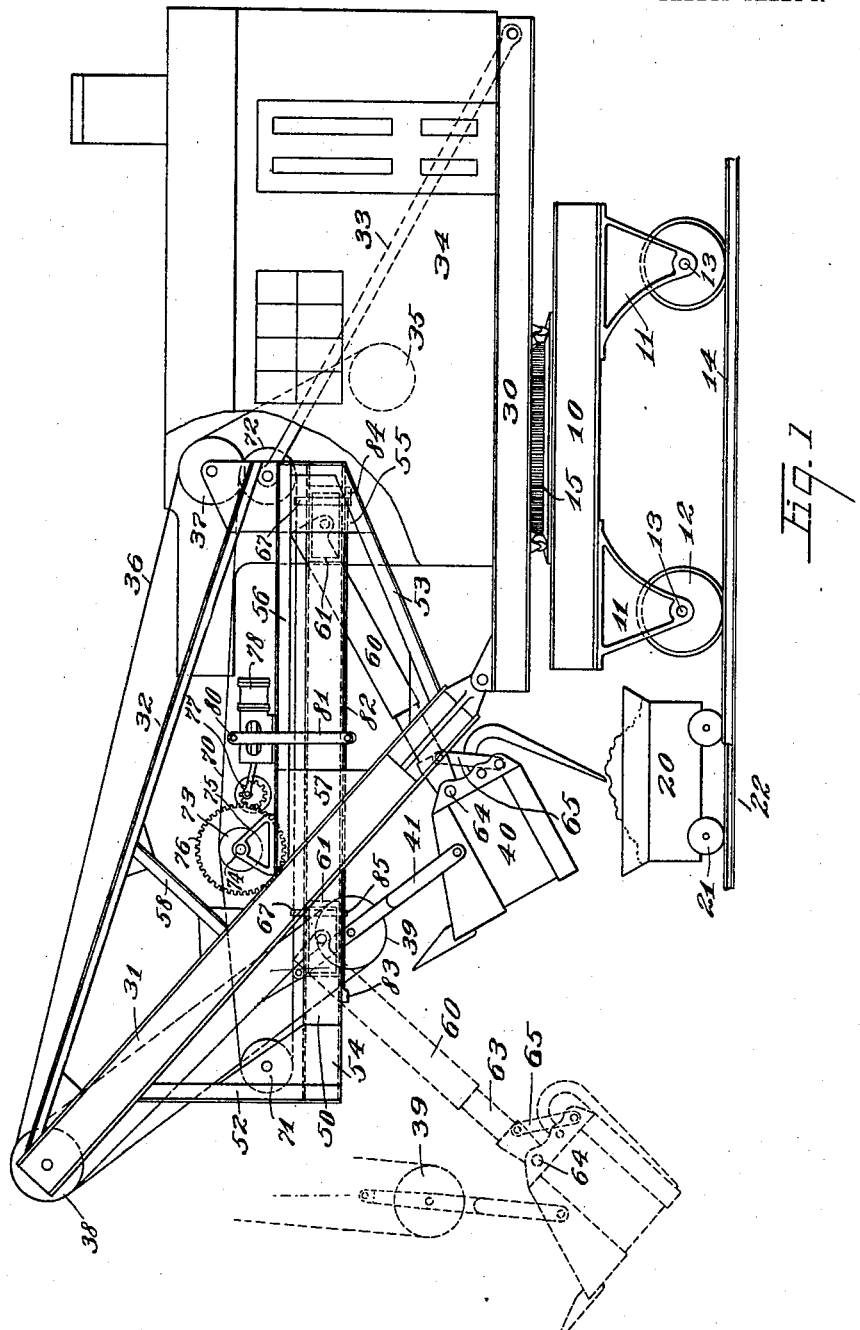
Figure 2:
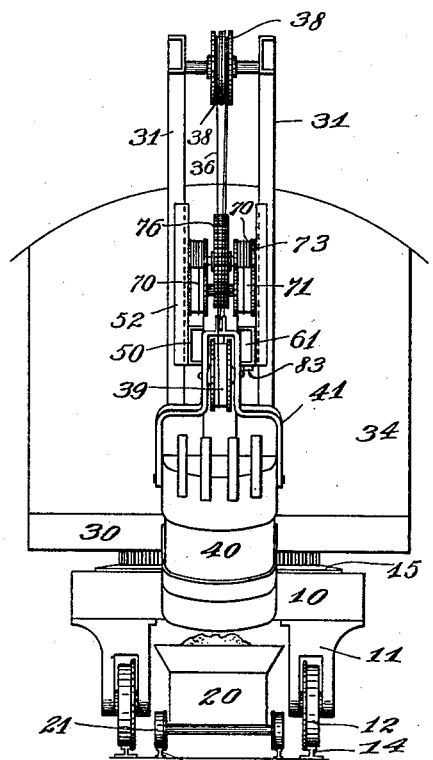
Figure 3:
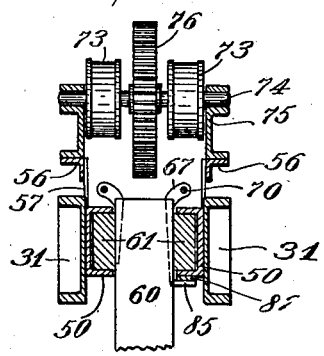

In the drawings, Figure 1 is a side elevation of my excavating apparatus complete; Fig. 2 is a front view thereof; Fig. 3 is a detail, being an enlarged vertical section through the trackway and showing the upper end of the dipper handle, and the mechanism for moving the same in or out.

As shown in the drawings, 10 represents the body of the truck of my excavator, 11 bifurcated brackets depending at the sides of such body, and 12 wheels carried by such brackets by short axles 13, each extending only across its bracket and journaled therein. By this means I provide a truck which has a wide opening underneath, as shown in Fig. 2. Through this opening is adapted to pass the cart designated 20 which has wheels 21 riding on rails 22 located intermediate of the rails 14 on which the main truck travels. By reason of the high position of the main truck 10 by its brackets 11 this cart 20 may be of suitable height and capacity to carry the full load of the bucket.

30 indicates the base of the superstructure of my excavating mechanism which is mounted by means of a turn-table 15 on the truck 10. Extending forwardly from this base is the diagonal boom 31 tied at its upper end to the base 30, as shown by the tie rods 32 and 33.

34 represents a suitable cab on the superstructure and 35 any suitable winding drum within such cab. From this winding drum a cable 36 leads forwardly over guide sheaves 37 and 38. It is adapted to draw forwardly and upwardly the bucket 40.

The connection of the cable 36 with the bucket is shown as consisting of a movable pulley 39 mounted on a bail 41 connected with the bucket, the pulley standing in a bight of the cable, and the cable thence passing over another sheave 38 and having its extreme end anchored to the upper end of the bail. Of course, if desired, the end of the cable could be anchored directly to the bucket, or other multiplication than that shown could be employed, as will be readily understood.

As shown, the boom 31 consists of a pair of outwardly facing channel beams which are suitably held parallel with each other with a space between them. Occupying this space and extending in a horizontal direction through it, is a trackway consisting of a pair of inwardly facing channel beams 50, which are riveted or otherwise secured to the channels 31, 31, where they cross. In front of such crossing the trackway and boom are connected by upwardly extending brace bars 52, while, at the rear, they are connected with the boom by diagonal brace bars 53.

A suitable gusset 54 may be employed to stiffen the connection between the beams 50 and the bars 52. Similarly, at the rear ends of the beams 50, plates 55 may be employed connected with those beams and with the braces 53. These plates may rise above the beams and constitute the anchorage for the tie bars 32 connected therewith, as well as carrying the journal pin for the idler 37. The bars 32 may be connected intermediately with the boom by braces 58. In this manner the trackway provided by the two channels 50 is rigidly mounted on the boom. The tie bars 33 hold the compound structure described in place being anchored thereto and to the base of the superstructure. The anchorage at their upper ends may be by means of a pin passing through the gusset plates 55 referred to.

60 designates the handle or strut for the scoop to which it is connected at its lower end. At its upper end this handle is pivotally carried by a pair of blocks 61 which slide within the two inwardly facing channels 50, whereby a horizontal slide way is provided for the upper end of the handle 60. If desired, the handle 60 may be made tubular and have a telescoping extension 63 connecting with the bucket. Such extension may be connected with the bucket by a pin 64 and a brace 65. This construction enables an accurate selection of the length of the strut so as to enable digging to a comparatively accurate depth.

To shift the upper end of the dipper arm in or out, I have provided a pair of endless cables 70, each of which are anchored to one of the blocks 61 (by ears 67 thereon) and then passes in opposite directions around the guide sheaves 71 and 72, and then, coming to an intermediate point, makes one or more turns around a winding drum 73. These drums 73 are above the trackway, being on a shaft 74 journaled in bearings 75, which are mounted on angle bars 56 secured to the plate 55 and a plate 57, the latter being connected to the channel beams 50 and the boom. On the shaft 74 is a gear 76, meshing with which is shown a pinion 77 which is adapted to be driven by a suitable engine or motor 78.

From the construction described it will be seen that the engine or motor will shift the upper end of the dipper arm along the horizontal trackway, in one direction or the other, as desired, and when this movement is combined with the proper operation of the drum 35 on the cable 36 the scoop may be caused to travel forwardly in a substantially horizontal plane, and then be raised through the position shown in dotted lines in Fig. 1, and then travel rearwardly to come into position over the cart 20, as shown in full lines. When the cart is loaded, the same may be drawn, or otherwise moved, beneath the truck 10 to the rear of the excavator for dumping the load.

I have shown a saftey device preventing the inadvertent driving of the blocks 61 by the engine beyond either end of the trackway 50. As shown, this safety device comprises a reversing valve 80 having an operating lever 81 connected with a slidable bar 82 mounted on the under siding of one of the channels 50 and having at its two ends the lugs 83 and 84. The corresponding block 61 is provided with a lug 85 adapted to engage either lug 83 or 84. This lug may be conveniently made by means of the out-turned lower end of the ear straps 67 on that block. By this mechanism, whenever the dipper handle reaches either end of its movement, if the engineer should neglect to shut off the power, the lug 85 hitting the corresponding lug 83 or 84 automatically reverses the engine, sending the blocks 61 in the opposite direction.

It will be seen that my mechanism avoids the necessity for swinging the dipper laterally to discharge the load. In an operation in tunnel work, for example, the superstructure is swung to one side or the other only enough to allow the scoop to act for the width of the floor of the tunnel. The load dumped into the cart 20 may pass rearwardly to the mouth of the tunnel for final discharge.

Having thus described my invention, what I claim is:—

1. In an excavating apparatus, the combination, with a scoop and its operating mechanism, of a wheeled truck for supporting such parts, said truck having its opposed wheels carried on independent axles whereby a clear space is provided beneath the truck, a cart of narrower gage than the truck adapted to pass beneath it, and two railed trackways one within the other on which the wheels of the cart and truck ride respectively.

2. The combination of a wheeled truck having its wheels carried on independent axles which do not extend across the truck, whereby a longitudinal open space is provided underneath the truck, a cart adapted to pass through such open space, a superstructure for the truck having a substantially horizontal trackway extending inwardly over the truck, a scoop, and a strut therefor, the upper end of which is pivotally mounted in and guided by the trackway whereby the scoop may be brought to a position directly over the cart and close to the truck.

3. In an excavating mechanism, the combination of a boom, a support therefor, a horizontal trackway carried by the boom and extending inwardly beyond the connection of the boom to the support, a dipper, a dipper arm connected therewith and having its upper end guided by the trackway, and means for moving such upper end inwardly beyond the point of support of the boom.

4. In an excavating apparatus, the combination of a supporting structure, a boom connected therewith at its lower end, a horizontal trackway secured to the boom, braces leading upwardly from the forward end of the trackway to the boom and diagonally downwardly from the rear end of the trackway to the boom, the trackway extending inwardly beyond the lower end of the boom, a scoop, and a scoop arm connected with the scoop and having its upper end guided on such horizontal trackway.

5. In an excavating apparatus, the combination of a supporting structure, a boom connected therewith at its lower end, a horizontal trackway secured to the boom and extending inwardly beyond the lower end of the boom, a scoop, a scoop arm connected with the scoop and having its upper end guided on such horizontal trackway, a truck on which the superstructure is swiveled, said truck having independent supports for its various wheels without through-axles, and a cart adapted to pass beneath the truck between its wheels and receive the discharge of the scoop when the upper end of the scoop arm is well inside the point of support of the boom.

6. In an excavating apparatus, the combination, with a support, of a boom connected therewith, a horizontal trackway carried by the boom, a dipper, a dipper arm, the upper end of which is guided by the trackway, a drum above the trackway and intermediate of its ends, sheaves near the ends of the trackway, a cable passing from said drum over said sheaves and connected with the upper end of the dipper arm, and a motor or engine for rotating the said drum.

7. In an excavating apparatus, the combination, with a support, of a boom connected therewith, a horizontal trackway carried by the boom, and comprising inwardly facing channels, a dipper, a dipper arm, the upper end of which is provided with a pair of blocks sliding in the trackway, a pair of drums, sheaves near the ends of the trackway, cables passing from said drums over said sheaves and connected with said blocks, and brackets supporting said shaft and extending above the trackway at an intermediate position.

8. In an excavating mechanism, the combination, with a support, of a diagonal boom connected therewith at its lower end, a horizontal trackway secured to the boom intermediately, braces between the trackway and boom, a tie rod connected with the outer end of the boom, and the rear end of the trackway, and a tie rod connected with the rear end of the trackway and at its other end connected with the support.

9. In an excavating mechanism, the combination, with a boom, of a trackway carried thereby, said trackway being provided near its rear end with a pair of vertical plates, tie rods leading from the upper end of the boom and connected at their rear end with said plates, and a tie rod connecting said plates with the structure carrying the boom.

10. In an excavating mechanism, the combination, with a boom, of a trackway carried thereby, said trackway being provided near its rear end with a pair of vertical plates, tie rods leading from the upper end of the boom and connected by said plates, a sheave near the forward end of the boom, winding mechanism on the superstructure, a cable leading therefrom over said sheaves, and a bucket with which said cable connects.

11. In an excavating mechanism, the combination of a boom composed of a pair of outwardly facing channel members spaced apart, a trackway composed of a pair of inwardly facing channel members passing through the boom, the channels of the boom and trackway coming back to back and being secured together, braces between the boom and trackway, a scoop, and an arm connected therewith and slidable at its upper end along the trackway.

In testimony whereof, I hereunto affix my signature in the presence of two witnesses.

HOLLIS H. HARRIS.

Witnesses:
ALBERT H. BATES,
BRENNAN B. WEST.